United States Patent
Björklund et al.

(10) Patent No.: US 7,053,302 B2
(45) Date of Patent: May 30, 2006

(54) INSULATED BUS BAR ASSEMBLY IN A VOLTAGE SOURCE CONVERTER

(75) Inventors: Anders Björklund, Västerås (SE); Tomas Larsson, Västerås (SE); Tommy Bergström, Västerås (SE)

(73) Assignee: ABB AB, Västerås (SE)

( * ) Notice: Subject to any disclaimer, the term of this patent is extended or adjusted under 35 U.S.C. 154(b) by 58 days.

(21) Appl. No.: 10/473,408

(22) PCT Filed: Mar. 26, 2002

(86) PCT No.: PCT/SE02/00594

§ 371 (c)(1),
(2), (4) Date: Jan. 7, 2004

(87) PCT Pub. No.: WO02/080324

PCT Pub. Date: Oct. 10, 2002

(65) Prior Publication Data

US 2004/0112626 A1   Jun. 17, 2004

(30) Foreign Application Priority Data

Mar. 30, 2001   (SE) .................................. 0101149

(51) Int. Cl.
*H02G 5/00*   (2006.01)
(52) U.S. Cl. .................... 174/68.2; 174/68.1; 439/212; 439/211; 439/138; 439/207
(58) Field of Classification Search ............. 174/68.2, 174/68.1; 439/212, 211, 138, 207
See application file for complete search history.

(56) References Cited

U.S. PATENT DOCUMENTS

| | | | |
|---|---|---|---|
| 5,202,578 A | | 4/1993 | Hideshima |
| 5,486,651 A | * | 1/1996 | Morgan ...................... 439/212 |
| 6,028,779 A | | 2/2000 | Sakamoto et al. |
| 6,133,533 A | | 10/2000 | Kauffman et al. |
| 6,142,807 A | * | 11/2000 | Faulkner ...................... 439/212 |

* cited by examiner

*Primary Examiner*—Dean A. Reichard
*Assistant Examiner*—Jinhee Lee
(74) *Attorney, Agent, or Firm*—Venable LLP; Eric J. Franklin

(57) ABSTRACT

The invention relates to a voltage source converter system, and includes a plane parallel bus bar assembly having conductor bars closely related for reducing induced voltage in the assembly. Each gap that is formed between adjacent conductor bars is completely filled by a polymer insulator which is formed for providing complete freedom of access to fully exposed external sides of the bus bar assembly. The invention also relates to a molded, single piece polymer insulator including an elongate rib member of continuous height and thickness, and elongate wing members angularly extended from each longitudinal periphery of the rib member.

6 Claims, 1 Drawing Sheet

INSULATED BUS BAR ASSEMBLY IN A VOLTAGE SOURCE CONVERTER

TECHNICAL BACKGROUND

Figure 1:
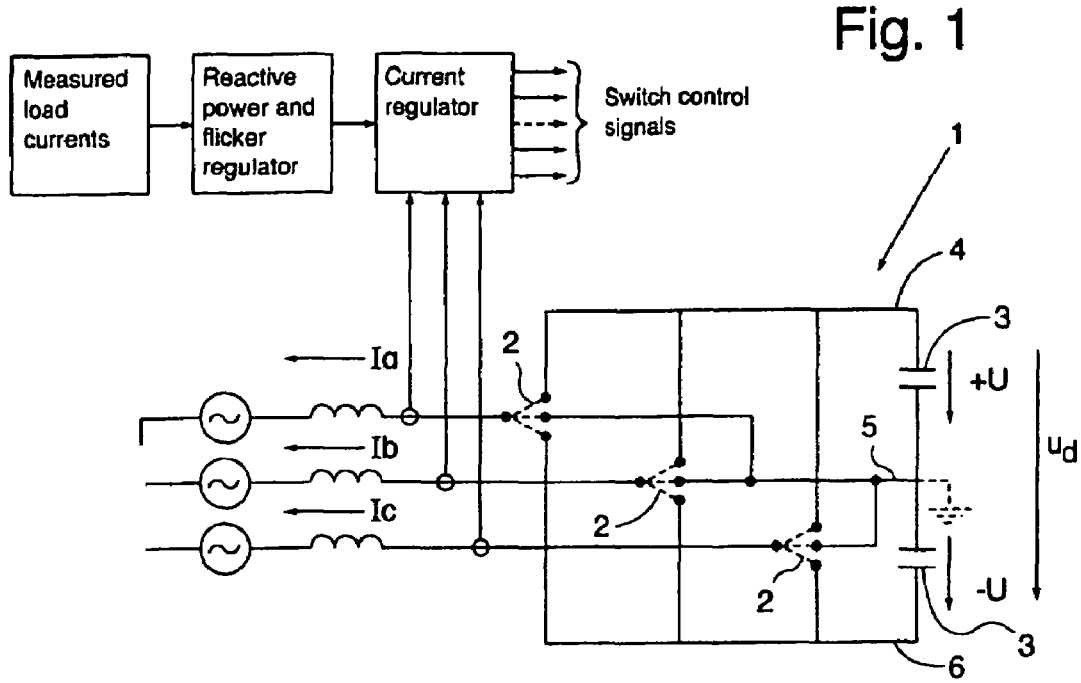

The invention relates to a voltage source converter system, and more specifically to a plane parallel bus bar assembly that is designed to allow high switching frequencies of a direct voltage component in the system. The invention also relates to the insulation of conductor bars incorporated in the bus bar assembly, and to a voltage source converter incorporating the bus bar assembly.

As used herein, "high switching frequencies" relates to frequencies reaching the order of approximately 1,500 Hz.

In the course of providing high quality electrical power and stabilized grid voltage, Voltage Source Converters (VSC) have been developed to control the magnitude, phase and frequency of the three phase AC-voltage. The VSC provides a capacity both to generate and absorb reactive power, mitigating voltage fluctuations generated by variations in loads and thus restoring voltage and current balance in the grid.

The main task for the voltage source converter is to inject corrective currents into each AC-phase of the network. Load variations in the grid are continuously monitored and processed for generating control signals to a switching device. The switching device allows high frequency switching of either one of the three levels of voltage (+U, O, −U) on the direct current side of the converter, into each AC-phase. If the switching frequency is high enough and switching is performed correctly, an almost sinusoidal current may be achieved in the AC-phases.

Implementation of semiconductor switches such as the Insulated Gate Bipolar Transistor (IGBT) valve makes it possible to achieve the desired switching frequencies. On the direct current side of the converter, a DC-capacitor of little or minimum energy storage capacity will be sufficient, since the converter average active power transfer is zero. The typical arrangement of a three level converter is diagrammatically illustrated by the simplified circuit of FIG. 1 in the drawings.

A fast commutation of current in the converter valves (high switching frequency) requires however, that inductance is reduced and kept to a minimum on the direct current side. In order to achieve low inductance, the direct current side comprises conductor bars that are closely spaced in side by side relation. Considering the voltage levels applied between the bars, typically in the order of 10–20 kV or more, it is a problem to secure sufficient insulation in the narrow gaps that are formed between the conductor bars.

Conventionally, conductor bars may be provided an insulation by wrapping, e.g., layers of insulating material about the conductor. The method is suffering from a limited accessibility to the conductor bar when electrically connecting to auxiliary equipment. The method is also suffering from a problem to secure an insulation that is free of air pockets, where partial discharges gradually may cause a break down of the insulation.

Polymer materials are known to have dielectric properties. In "Electric Field Reduction Due to Charge Accumulation in a Dielectric-Covered Electrode System", IEEE Transactions on Dielectrics and Electrical Insulation, Vol.7 No. 3, Jun. 2000, H. J. M. Blennow et al. discusses charge formation at the dielectric surfaces of an electrode system covered with silicone rubber.

OBJECT OF THE INVENTION

In view of the above related problems, it is an object of this invention to provide a bus bar assembly for a voltage source converter system, wherein the bus bars are shielded by an insulator that is formed to allow a minimum gap between adjacent conductor bars for low inductance to be achieved on the direct current side of the converter.

Another object is to provide a bus bar assembly for a voltage source converter system, wherein the bus bars carry an insulator that is formed substantially to provide complete freedom of access to the external sides of the bus bar assembly.

Yet another object is to provide a bus bar assembly, having an insulation inserted between the conductor bars and designed for avoiding the occurrence of partial discharges.

SUMMARY OF INVENTION

Briefly, the invention suggests a polymer insulator element to be formed and to be inserted in the gap between adjacent conductor bars in a plane parallel bus bar assembly, such that the gap is completely filled by the polymer insulator. The insulator element is formed to prevent current to leak about the conductor bars, but leaves the external sides of the bus bar assembly open for access and for free connection to associated equipment.

Preferably, the polymer insulator is a homogenous, molded single piece element having a trough-like configuration, comprising in section an elongate rib member that is clamped between the conductor bars such that wing members extend angularly from the longitudinal peripheries of the rib member to receive and enclose the conductor bar about three sides thereof, leaving the fourth side fully open to the surrounding space.

DRAWINGS

Figure 2:
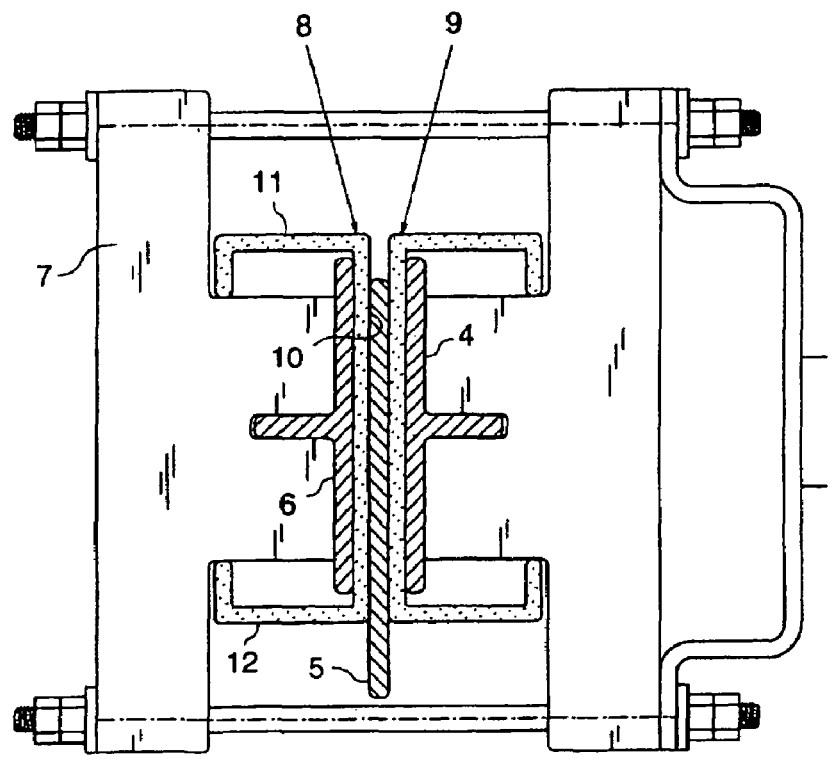

The invention is further disclosed below, reference being made to the accompanying, diagrammatic drawings wherein:

FIG. 1 is a simplified three level circuit comprising a voltage source converter system wherein the invention is advantageously implemented; and FIG. 2 is a sectional view of a bus bar assembly according to the invention.

DETAILED DESCRIPTION OF THE INVENTION

Referring to FIG. 1, an AC/DC-converter 1 is diagrammatically shown in a voltage source converter system (VSC). In the AC/DC-converter 1, switches 2 are controlled to switch either one of the three levels of voltage on the DC-side (+U, O, −U) into each AC-phase (Ia, Ib, Ic). The switches are controlled relative to measured load currents, and are operative for injecting corrective current into each phase of the network. A high switching frequency is desirable for achieving fast response—the implementation of IGBT converter valves provides a turn-off capacity reaching switching frequencies up to approximately 3,000 operations per second. To arrive at such fast commutation of current in the converter valves, it is of crucial importance to keep inductance low on the direct current side of the converter.

The direct current side of the converter 1 comprises a DC capacitor package 3, from which current is supplied through the converter valves or switches 2. In order to keep inductance low, the current is supplied through conductor bars 4, 5, 6 in a plane parallel bus bar assembly wherein the conductor bars are closely arranged with a gap distance in the order of 10 mm between adjacent conductor bars. The small distance in combination with a direct current voltage in the order of tens of kV applied between the bars require an insulating material to be inserted in the gap/gaps.

Referring now to FIG. 2, a plane parallel bus bar assembly 4–6 according to the invention is shown in a sectional view. A central conductor bar 5 is sandwiched between side conductor bars 4 and 6. The conductor bars 4–6 are clamped together by a number of clamps 7, distributed in axial direction of the bus bar assembly. An insulator element 8,9 is inserted in each gap that is formed between adjacent conductor bars 4,5 and 5,6, respectively. The insulator elements 8,9 are formed and dimensioned such, that the gaps are completely filled by the insulator elements when braced in longitudinal contact with each planar side of the central conductor bar 5 and an opposing, planar side of each adjacent side conductor bar 4 and 6, respectively.

The insulator elements 8,9 are formed from a homogenous material, such as a polymer material. In order to reduce the risk of, or to avoid partial discharge, it is desirable to avoid the formation of air pockets in the insulating material as well as between insulator and conductor bars. Silicon rubber has successfully proved to be a suitable material for the insulator elements 8 and 9, due to its inherent elasticity and ability to conform to the conductor bar surfaces and also due to a capacity for charge accumulation on the silicon rubber surface that relieves any air pockets that are eventually formed, and in this way generates a decay of possible partial discharge activity.

The insulator elements 8,9 are formed with an elongate rib member 10 of continuous height and thickness, and elongate wing members 11,12 are angularly extended from each longitudinal periphery of the rib member 10. In section, the insulator elements 8,9 are thus provided a trough-like configuration for substantially surrounding coverage about three sides of each side conductor bar 4,6, thus leaving a fourth side fully open for free access. Accordingly, the bus bar assembly 4–6 has fully exposed external sides for optional connection to associated equipment.

The wing members 11,12 may be extended at substantially right angles from the rib member 10, and have a width that is dimensioned relative to the current leakage paths that may be expected in connection with the voltages involved. The corners of the insulator element profile may be rounded, as well as the corners of the conductor bar peripheries in order to further avoid partial discharge between conductor bars and the insulator element.

The insulator elements 8,9 are advantageously molded, and preferably by extrusion of a silicon rubber composition for producing a homogenous, single piece insulator element.

In the bus bar assembly 4–6, the conductor bars are contemplated and designed for supplying the converter valves/switches 2 from the capacitors 3 preferably without any distortion of the voltage. In a preferred embodiment, the bus bar assembly comprises flat aluminum bars 4–6 having a high width to thickness ratio in order to reduce inductance. As illustrated in FIG. 2 of the drawings, the central conductor bar 5 projects out of the assembly on an upper or lower side thereof for free access and connection to associated equipment, such as the converter valves and capacitors. The side conductor bars 4 and 6 are advantageously T-shaped in section, providing a longitudinal connection rail or side rail for free access and connection to the associated equipment.

As disclosed herein, the bus bar assembly and insulator elements of the invention are operative for supplying DC-voltage to converter valves in a voltage source converter system. However, the advantages achieved by the invention as claimed may be arrived at in any public service or local network implementation where it is desired to access a voltage that is free from distortion.

What is claimed is:

1. An insulated bus bar assembly in a voltage source converter system, the bus bar assembly comprising:
   conductor bars closely spaced for minimizing the generation of induced voltage in the assembly, the conductor bars comprising an elongated central conductor bar sandwiched between two side conductor bars in a plane parallel assembly, wherein a gap between adjacent conductor bars is completely filled by a polymer insulator that is braced in longitudinal contact with a planar side of the central conductor bar and an opposing, planar side of the adjacent side conductor bar, respectively, said polymer insulator comprising a single piece polymer insulator including a trough-like configuration for surrounding coverage of each side conductor bar about three sides thereof leaving a fourth side open for free access.

2. The bus bar assembly according to claim 1, wherein the insulator is formed by extrusion of a silicon-rubber composition to define a homogenous, elongated body having a trough-like sectional profile.

3. The bus bar assembly according to claim 1, wherein the single piece polymer insulator comprises an elongate rib member of continuous height and thickness, and elongate wing members angularly extended from each longitudinal periphery of the rib member.

4. The bus bar assembly of claim 3, wherein the wing members extend substantially at right angles relative to the rib member.

5. A voltage source converter system comprising:
   a direct voltage source, converter valves and a bus bar assembly for supplying direct current from the direct voltage source through the converter valves;
   said bus bar assembly having plane parallel conductor bars closely spaced in side by side alignment, and
   an insulator element braced in longitudinal contact with each planar side of a central conductor bar and an opposing, planar side of each one of two adjacent side conductor bars, respectively, of the bus bar assembly;
   the conductor bars and insulator elements being clamped together to form an insulated, plane parallel bus bar assembly, wherein
   each insulator element is a molded, single piece polymer insulator having a trough-like configuration for substantially surrounding coverage of each side conductor bar about three sides thereof, leaving a fourth side open for free access and connection of associated equipment.

6. The voltage source converter system of claim 5, wherein each gap that is formed between adjacent conductor bars of the plane parallel bus bar assembly is defined by the continuous thickness of a rib member of said insulator element, the insulator element having wing members extending angularly from each longitudinal periphery of the rib member in such way, that a longitudinal connection rail formed on said side conductor bar is completely free for access and for connection of associated equipment.

* * * * *